May 13, 1930. N. A. HALLWOOD 1,758,036
WEIGHING SCALE
Filed Feb. 8, 1926 4 Sheets-Sheet 1
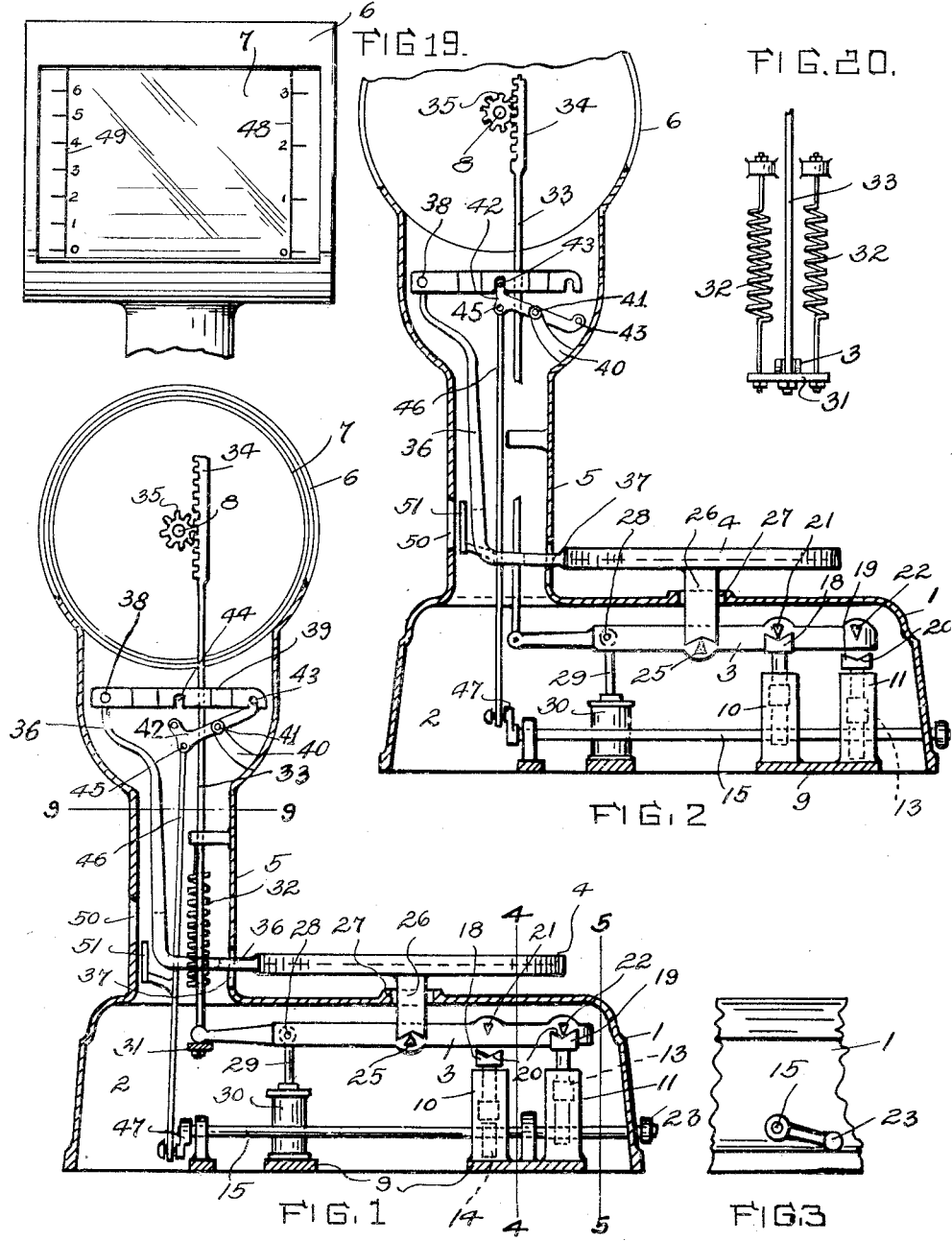
INVENTOR.
NATHAN A. HALLWOOD
BY
W. S. McDowell
ATTORNEY.

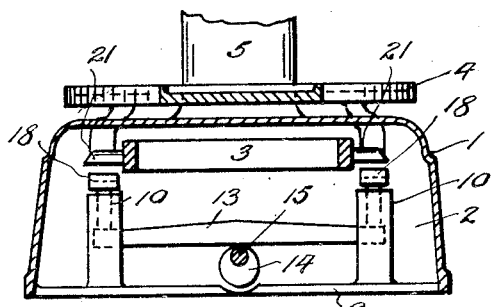

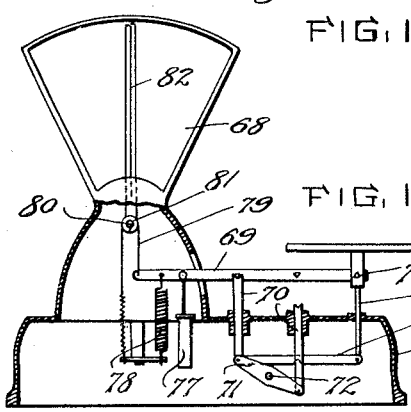

May 13, 1930.　　　　N. A. HALLWOOD　　　　1,758,036
WEIGHING SCALE
Filed Feb. 8, 1926　　　　4 Sheets-Sheet 4
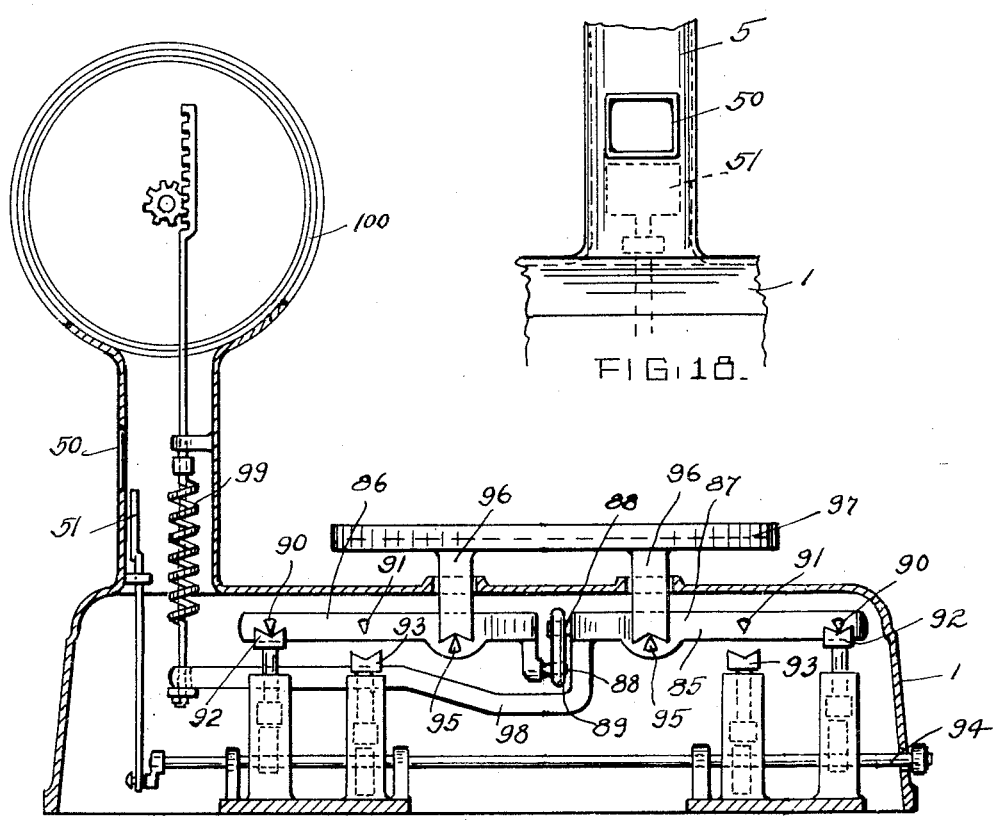
FIG.18.
FIG.16
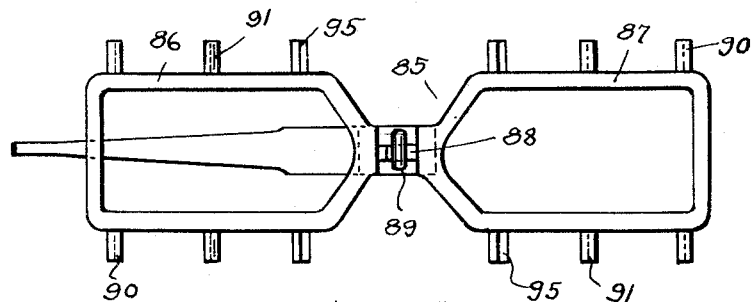
FIG.17.
INVENTOR.
NATHAN A. HALLWOOD
BY
ATTORNEY.

Patented May 13, 1930

1,758,036

UNITED STATES PATENT OFFICE

NATHAN A. HALLWOOD, OF COLUMBUS, OHIO

WEIGHING SCALE

Application filed February 8, 1926. Serial No. 86,787.

This invention relates to weighing scales and is especially directed to the provision of an improved scale which, upon simple adjustment, will have its weighing limits changed or varied.

Experience has demonstrated that in the operation of most commercial types of weighing scales, employed in the merchandising of groceries, confections and the like, fully ninety percent of the total number of weighing operations is restricted to individual weights of under five pounds. Thus if a scale has a weighing limit of, for example, ten pounds, its weight indicator in the vast majority of operations is restricted to half or less of the total graduated surface of the indicator, and the operation of the scale is usually stiff and rigid and especially difficult in reaching true weight balances. As a result of this condition differences and error are frequently present in the reading of most weights, or in securing accurate balances since, ordinarily, the graduations are so closely spaced, due to the enlarging of the weighing limits of the scale, that accuracy in weight reading is rendered extremely difficult in the practical and rapid operation of the scale.

In accordance with the present invention this condition, among others, is avoided by the provision of a scale constructed to provide adjustments adapting the scale readily to any one of a plurality of weighing ranges, the low range adjustment enabling, for example, bodies of five pounds or under to be weighed, but at the same time utilizing the entire reading area of the weight indicator, so that the weight graduations on the indicator for the various operating ranges, especially the "low range", may be divided with the greatest degree of spacing in order that the travel of the indicator may be clearly discerned and its relation to the weight indications rendered true and exact and capable of being more closely observed than when higher weighing ranges are employed, thus enabling the scale, in the greatest majority of operations, to be read with ease and accuracy and yet without sacrificing the necessary effective weighing limits of the scale.

It has heretofore been proposed to use a tare weight or poise in conjunction with balance scales to increase their weighing limits. As ordinarily constructed, however, such tares or the like have to be swung or moved into engagement with the scale beam or lever. With this arrangement there is no assurance that the tare will always be properly positioned or centered on the beam. Therefore, in accordance with the present invention it is proposed to use positive mechanical means for the purpose of changing the distances between the beam fulcrum bearings and the bearings of the load receiver so as to change the leverage on the resisting member of the scale, whether such resisting members take the form of either springs, pendulums or weights.

It is a further object of the invention to provide means for varying the effective length of the beam check when the beam takes the form of a simple lever, the arrangement being such that the shorter length of the check is put into operation to correspond to the higher multiple of operation of the beam and vice versa. Again, the invention provides for the provision of means for enabling a purchaser or customer to know which weighing range of the scale is employed and to provide automatic means for changing the effective length of the check when the bearing shifting mechanism is actuated.

It is a further object of the invention to provide a flexible check for the purpose of improving on the checks as ordinarily used in scales employing a simple lever beam.

In the drawings, forming a part of this specification, and in which similar characters of reference denote like and corresponding parts:

Figure 1 is a view of a drum type indicator scale, disclosing the two sets of fulcrum posts for effecting the support of the scale beam, the associated check construction and the actuating means therefor, this view also shows the scale when adjusted for low range operations, Figure 2 is a similar view showing the fulcrum posts and the check shifted to increase the weighing capacity of the scale, the parts being shown in their so called "upper range" positions, Figure 3 is a fragmentary view disclosing in side elevation the crank which operates the mechanical units of the scale to increase or decrease the capacity of the latter at will, Figure 4 is a transverse vertical sectional view taken through one of the fulcrum bearings of the scale on the plane indicated by the line 4—4 of Figure 1, the bearing being shown in its lowered or inactive position, Figure 5 is a similar view on the line 5—5 of Figure 1, showing the bearing in its elevated or active position, Figure 6 is a vertical longitudinal sectional view taken through one of the fulcrum bearings on a scale somewhat larger than that shown in Figure 4, Figure 7 is a vertical sectional view on the line 7—7 of Figure 6, Figure 8 is a front elevation of the scale tower or housing, Figure 9 is a horizontal sectional view taken on the plane indicated by the line 9—9 of Figure 1, Figure 10 is a side elevation of the improved flexible check used in connection with the scale, Figure 11 is a plan view thereof, Figure 12 is a vertical sectional view disclosing a slightly modified form of scale showing a reciprocatory wedge member for shifting the operating positions of the fulcrum bearings and the beam check.

Figure 13 is a similar view of a still further modified form of shifting mechanism wherein the latter is of the oscillatory type, Figure 14 is a sectional view on the line 14—14 of Figure 13, Figure 15 is a modified form of the invention disclosing a "fan" type of indicating tower, rather than the types heretofore specified, Figure 16 is a vertical sectional view taken through a modified form of scale using a compound lever or beam, in lieu of a simple type of lever, Figure 17 is a plan view of the beam shown in Figure 16, Figure 18 is a detail view in side elevation of the tower disclosed in Figure 16, Figure 19 is a front elevation of the upper portion of the indicator tower of the type of scale disclosed in Figure 1, Figure 20 is a detail front elevation of the beam supporting springs employed in connection with the preferred form of the invention, Figure 21 is a detail front elevation of a modified form of weight indicating tower wherein a shiftable shutter is disclosed for limiting the view.

Referring more particularly to the drawings, and to the form of the invention illustrated especially in Figures 1 to 11 inclusive, there is disclosed a scale which comprises a housing 1 of any suitable form and design. In this instance the housing is formed to include in the base thereof a beam chamber 2 in which, in a manner to be hereinafter described, is pivotally mounted a weighing beam or lever 3, which carries a weight support 4. In this instance the housing is formed to include an upwardly extending indicator tower 5, terminating at its upper end in a substantially cylindrical casing 6, in which is rotatably mounted an indicating drum 7 of any suitable design, the said drum rotating about the axis of a supporting shaft 8 journaled in connection with the casing 6.

To effect the pivotal support of the beam the scale in the simple form of the invention under discussion, is formed to include a base plate or web 9 upon which is mounted, and disposed within the chamber 2, spaced pairs of upstanding posts 10 and 11. These posts, as shown in Figure 4, are each provided with vertically disposed recesses 12 in which is mounted for vertical travel the ends of transversely extending cross members 13, which have their under medial edges arranged to rest upon the peripheral portions of cams 14, fixed to a longitudinally extending operating shaft 15.

Arising from the ends of the cross members 13 are upwardly extending studs 16, which pass loosely through guiding openings 17 formed in connection with the upper ends of the posts 10 and 11. The extreme upper ends of the studs 16 are equipped with machined bearing blocks 18 and 19 of agate or steel, which have substantially V shaped recesses 20 provided in the upper surfaces thereof. These recesses are adapted to receive, in transversely aligned blocks, the knife edge fulcrums 21 and 22, of hardened steel, which project rigidly and accurately from the sides of the beam 3, so that a fulcrum bearing support will be provided for the beam. It will be observed that the cams 14 are set in opposed relation on their supporting shaft 15 so that when one cam is in a raised position, as shown in Figure 5, the opposite or complemental cam will be in a lowered position, as in Figure 4. Thus, by the present invention there is provided a plurality of available fulcrum supports which, upon the rotation of the shaft 15, may be moved selectively into supporting relationship with the beam 3, enabling the point of fulcrum support of the beam to be shifted longitudinally of the length of the latter, either toward or away from one end thereof. The design of the cams 14 is such that one pair of blocks is always in supporting engagement with the knife edges 21 and 22 so that in no position of adjustment will there be a dropping of the beam to injure the delicate and accurate adjustment of the knife edges. As shown in Figure 3 the outer end of the shaft 15 is equipped with an operating crank 23, arranged exteriorly of the housing 1, one end of the shaft being journaled in the wall of the housing, while the opposite end thereof is supported by a bearing bracket 24 carried in connection with the plate or web 9.

At a medial point the beam 3 is provided with a third set of knife edges 25, upon which is positioned the downwardly disposed stem 26 of the platen or weight support 4, the stem 26 operating loosely through an opening 27 provided in the top of the housing. In the preferred form of the invention the bearing support 25 between the weight support and the beam occupies a fixed position, and the fulcrum bearings for the beam are shiftable with respect thereto so as to vary the spacing between the point of pivotal support of the pan 4 and the points of pivotal support for the beam 3. It is obvious, however, that it is within the scope of the invention to reverse this order of parts and shift the pivotal support 25 relative to the fulcrum supports 21 and 22. The outer end of the beam 3 is pivotally connected as at 28 with the stem 29 of a dash pot 30, used, as ordinarily, in stabilizing the oscillations of the beam 3. The extreme outer end of the beam 3 rests upon a stirrup 31 supported by a plurality of vertically arranged springs 32, mounted within the tower 5 and which tend to resist any deflection of the beam from its normal or balanced position, the resistance of the springs increasing, as usual, with the weight applied to the support 4. Also, connected with the outer end of the beam is an upwardly extending rod 33, passing vertically through the tower 5, and having its upper end equipped with a toothed rack 34, arranged for engagement with a pinion 35 mounted on the shaft 8, so that the drum 7 may be rotated, as usual, to indicate weights.

The weight support or platen 4 is also provided with a rigidly connected arm 36, the lower horizontal portion of which extending through a slot 37 provided in the tower 5, while the major or vertically extending portion of the arm 36, arises within the tower and has its upper end pivotally connected as at 38 with a horizontally disposed check 39.

The check is provided with a pivotal or fulcrum support which is variable to accord with the spacing between the fulcrums 21 and 22, and this is accomplished automatically in the present instance by providing the interior of the tower 5 with a bracket 40, to which is pivoted as at 41 the central portion of a fulcrum arm 42. The outer ends of this arm are provided with fulcrum pins 43, which are alternately or selectively positionable within one or the other of a pair of recesses 44 provided in the check 39. Pivotally connected as at 45 with the check 39 is a vertically disposed rod 46, which has its lower end connected with the outer portion of a crank 47 fixed to rotate upon the inner end of the shaft 15.

By this construction it will be observed that when the shaft 15 is rotated so as to change the fulcrums 21 and 22 from active to inactive positions, and vice versa, the arm 42 is oscillated by the rotation of the shaft 15, resulting, as shown in Figures 1 and 2, in the positioning of the pin 43 in one or the other of the recesses 44, so that the effective length of the check will accord with the spacing existing between the fulcrums 21 and 22 and the pivotal support 25 of the weight pan. Thus, it will be seen that the beam and the check will maintain the required parallelogram operating positions at all times.

In practice, it will be seen that when the scale, as shown in Figure 1, has the parts thereof adjusted for weighing in its low range capacity the beam 3 will be supported at its extreme end position by the fulcrum bearing 22. In this position weights applied to the support 4 exert maximum pressure or force on the beam due to the maximum leverage provided and, for example, this arrangement is such that in many commercial types of scales the application of a weight of five pounds will result in rotating the indicator drum 7 to its maximum extent, thus enabling the weight graduations 48 on the drum, employed for low range weighing operations, to be spaced to their maximum extent, so that ease, accuracy and facility are to be had in the reading of the scale when in its normal or low range operating condition. Now, if it is desired to increase the weighing capacity of the scale to any desired multiple, for example to double it, it is necessary merely to rotate the shaft 15 by operating the crank 23. This will move the other set 21 of fulcrum bearings into supporting relation with the beam, so as to shorten the leverage distance between the point of bearing support of the pan 4 and the beam 3, in this instance, reducing it one-half, so that it will take a proportionately greater weight to deflect the beam from its neutral or normal positions. When in this upper or higher range of weighing capacity, a second set of graduations 49 are employed on the drum 7, which may be in the form of a distinguishing color, as regards the first named set of graduations. It will be observed, that the graduations 49 do not possess the same wide spacing as the graduations 48, since it is necessary in the upper range of operation to provide for the handling of greater weights and therefore the spacing of the graduations 49 is proportionately limited. It will be observed that in the shifting of the scale from one operating range to the other, the pivotal support for the check has also been automatically shifted so as to maintain its proper swinging connection with the beam 3 and to exert its required stabilizing action on the weight support 4. Preferably, the front of the tower 5 is formed with an opening 50 through which is viewable a flag or other indicator 51. This indicator, when the parts of the scale are in the position shown in Figure 1, is out of view, but when the higher range is employed, the shifting of the check automatically elevates the indicator 51 carried by the rod 46 into registration with the opening 50, calling the purchaser's attention to the second set of graduations 49, which are used for the higher weighing range.

In view of the foregoing it will be seen that the present invention provides a scale including means by which is minimized the reading error ordinarily present in standard scale constructions by enabling the scale to be shifted from a low weighing range to a higher one, or vice versa and accomplishing this in such a manner as to provide normally for a clear reading of the indicator graduations. The check construction 39, may, as shown in Figure 10, consist of a pair of flat metallic strips, bent to provide the diagonally intersecting webs 52, and the spaced parallel body portions 53, the webs 52 being provided with alternating recesses and shoulders by which the webs are locked together to secure the necessary stability of connection, and yet to enable the check to respond to torsional strains without losing its accuracy.

In the form of the invention disclosed in Figure 12, the fulcrum bearings 21 and 22, instead of being raised and lowered by the action of cams, as in the preferred form, have their positions controlled through the medium of a sliding wedge member. This wedge member is indicated at 55, and as shown includes a handle portion 56, projecting beyond the housing 51, and supported interiorly of the housing by means of bearings provided in connection with the web or base plate 9. The member 55 includes an enlargement 57, having reversely inclined surfaces 58 with which are engaged shoes 59 provided on the lower ends of the studs 16ª. It will be seen that by reciprocating the wedge member, the studs may ride over the surfaces 58 so as to effect the selective engagement of the fulcrum bearings carried thereby with the pivoted end of the beam. Similarly, the extreme inner end of the wedge member is provided with an inclined surface 60, arranged to engage with a shoe 61 provided on the lower end of the rod 46, employed for controlling the positioning of the check means in the upper part of the scale housing.

In the form of the invention disclosed in Figures 13 and 14 the same thought is carried out in another mechanical way. In this form of the invention there is provided a pivoted fulcrum support 62 journaled about a horizontal axis 63 carried in connection with the scale housing. On opposite sides of the axis 63 the support 62 is provided with the blocks 18ª and 19ª, which upon the oscillation of the support 62, may be selectively engaged with the fulcrum edges 21 and 22. The support 62 is locked in any of its adjusted positions through the medium of a pivoted operating handle 64, which is movable in a vertical slot 65 provided in the wall of the housing 1. The ends of the slot 65 terminate in offset shoulders 66, with which the handle 64 is engaged so as to prevent accidental loss of position on the part of the pivoted support 62. Suitable linkage 67 may be connected with the support 62 for the purpose of operating the check means.

In the form of the invention diagrammatically illustrated in Figure 15 the scale housing 1 is provided with a fan shaped tower 68 in which to receive the weight indicating mechanism. It is obvious that any suitable type of weight indicating mechanism may be employed in lieu of the drum indicator set forth in the preferred form of the invention. For this reason the invention as used in connection with a fan type indicator is illustrated in Figure 15. In this form of the invention the scale beam 69 is fulcrumed upon one or the other of the available supports 70, which may be moved into active or inactive positions, with relation to the beam, by means of mechanism 71 mounted upon a rotatable operating shaft 72. The extreme outer end of the beam carries the weight support 73, which is pivoted to the beam as at 74. Depending from the support is a stem 75, which has its lower end pivotally connected with the check 76, the latter being also pivotally connected with the supports 70. The check 76 has pivotal connection at one end with the lower end of the stem 75, and has its opposite end pivotally related to the opposite ends of the member 71 used in raising and lowering the spaced supports 70, the arrangement being such that the effective length of the check will be directly proportional to the distance between the effective supports 70 and the stem 75.

The outer end of the beam 69 is engaged with a dash pot 77 and also with a spring resistance 78, by which deflection of the beam from normal is resisted in the usual manner. Also connected with the beam is a strap 79, arranged to pass over a drum 80 mounted upon an indicator hand shaft 81, the indicator hand 82 being connected with said shaft and movable over the graduated surface 83 of the indicator proper.

In the form of the invention set forth in Figures 16 to 18 inclusive, a compound beam or lever 85 is utilized, in lieu of the simple type of lever discussed in describing the previous forms of the invention. A compound lever or beam of this type is well understood by those versed in the art and consists of aligned beam sections 86 and 87, having the adjoining ends thereof provided with offset pins 88 flexibly connected by means of a link 89 passing around the pins. Each section 86 and 87 carries spaced sets of knife edge fulcrums 90 and 91 adapted to be supported by sets of available fulcrum blocks 92 and 93, the latter being rendered selectively available through the provision of rotatable eccentrics mounted upon a manually rotated shaft 94. The inner ends of the beam sections carry knife edges 95, which receive the depending stems 96 carried by the weight support 97. The compound beam, of course, eliminates the necessity of the employment of a check, since the load forces applied to the weight support are balanced and neutralized by the inherent design of the beam structure 85. The beam sections 87 are formed with a longitudinally extending arm 98, connected with a spring resistance 99, and with an indicator structure 100. It will be observed that in this form of the invention, as well as in the previously described forms the principle of changing the position of the fulcrum support for the beam is adhered to, and while other variations and modifications of the invention may be shown and described embodying this principle, yet it is thought that the various embodiments of the invention and its possible uses in view of the foregoing will be readily appreciated by scale artisans, and therefore a more extended description and disclosure has been accordingly omitted. It will be observed that by the simple expedient of shifting the fulcrum support of the bearing a plurality of weighing ranges in a single scale may be effected, and it is to this principle especially that the present invention is addressed.

What is claimed is:

1. In a scale, a weighing beam, a pivotal support for said beam, a check, a pivotal support for said check, and a common operating means for simultaneously shifting the operating positions of said supports with respect to said beam and check.

2. In a scale, a weighing beam, a pivotal support for said beam, a weight receiver, a pivotal connection between said weight receiver and said beam, a check, a pivotal support for said check, a pivotal connection between said check and said weight receiver, and means for shifting the working positions of said pivotal supports for said beam and check in unison.

3. In a scale, a weighing beam, spaced sets of trunnions projecting laterally from said beam, spaced sets of bearing blocks selectively engageable with said trunnions to effect the pivotal support of said beam, and positively operating means for moving said blocks selectively into or out of engagement with said trunnions but for maintaining said trunnions at all times in engagement with at least one set of said blocks.

4. In a scale, a weighing beam, spaced sets of knife edge trunnions projecting laterally from said beam, spaced sets of bearing heads selectively movable into and out of engagement with said trunnions, an operating shaft, an eccentric fixed to rotate with said shaft and engageable with said heads to move the latter alternately into and out of engagement with said beam trunnions.

5. In a scale, a weighing beam, spaced sets of trunnions projecting laterally from said beam, spaced sets of bearing heads, an operating shaft, means carried by said shaft for moving said head successively into and out of engagement with said trunnions, a check, shiftable means for pivotally supporting said check, and a link connection between said shiftable means and said operating shaft.

6. In a scale, a weighing beam, a pivotal support for said beam, a weight receiver, a pivotal connection between said weight receiver and said beam, a check, a pivotal support for said check, a pivotal connection between said check and said weight receiver, means for shifting the working positions of said pivotal supports for said beam and check, and means operable in connection with said first named means for indicating a shift of said pivotal supports.

7. In a scale, a weighing beam, spaced sets of trunnions projecting laterally from said beam, spaced sets of bearing heads, an operating shaft, means carried by said shaft for moving said heads successively into and out of engagement with said trunnions, a check, shiftable means for pivotally supporting said check, a link connection between said shiftable means and said operating shaft, and means operable in unison with said link for automatically indicating a change of position of one set of said heads.

8. In a scale, a weighing beam, a pivotal support for said beam, a weight receiver, a pivotal connection between said weight receiver and said beam, a check, a pivotal support for said check, a pivotal connection between said check and said weight receiver, a movable weight indicator provided with two sets of graduations, means for actuating said indicator to denote applied weights, means for simultaneously shifting the working positions of said pivotal supports for said beam and check and indicating which of the said graduations should be read.

In testimony whereof I affix my signature.

NATHAN A. HALLWOOD.